US009274134B2

(12) United States Patent
Lu et al.

(10) Patent No.: US 9,274,134 B2
(45) Date of Patent: Mar. 1, 2016

(54) COUPLER FOR SMART ELECTRICAL WHEEL FOR ELECTRICAL BIKES

(75) Inventors: Kuan-Ying Lu, Taichung (TW); Hsin-Chih Chen, Hsin-Chu (TW); Juan Bautista Belon, San Diego, CA (US)

(73) Assignee: BELON ENGINEERING, INC., San Diego, CA (US)

( * ) Notice: Subject to any disclaimer, the term of this patent is extended or adjusted under 35 U.S.C. 154(b) by 438 days.

(21) Appl. No.: 13/415,829

(22) Filed: Mar. 8, 2012

(65) Prior Publication Data

US 2012/0261978 A1 Oct. 18, 2012

Related U.S. Application Data

(63) Continuation-in-part of application No. 12/989,408, filed as application No. PCT/US2010/023424 on Feb. 6, 2010, now Pat. No. 8,538,615.

(60) Provisional application No. 61/206,909, filed on Feb. 6, 2009.

(51) Int. Cl.
*B62K 25/02* (2006.01)
*B60B 27/02* (2006.01)
(Continued)

(52) U.S. Cl.
CPC .. *G01P 3/22* (2013.01); *B62M 6/40* (2013.01); *B62M 6/45* (2013.01); *B62M 6/50* (2013.01); *B62M 6/60* (2013.01); *B62M 6/90* (2013.01); *G01C 9/10* (2013.01); *G01P 3/486* (2013.01); *G01P 15/18* (2013.01); *B60B 27/026* (2013.01); *B60B 35/009* (2013.01); *B60W 2300/36* (2013.01); *B62K 25/02* (2013.01); *B62K 2206/00* (2013.01); *G01C 2009/107* (2013.01); *Y10T 29/4978* (2015.01)

(58) Field of Classification Search
CPC .. B62K 25/02; B62K 2206/00; B60B 27/026; B60B 35/004; B60W 2300/36; B62M 6/40; B62M 6/60; B62M 6/65; B62M 6/90
USPC .................. 280/200–210; 70/233; 301/124.2
See application file for complete search history.

(56) References Cited

U.S. PATENT DOCUMENTS

D168,401 S * 12/1952 Harris ............................ D10/69
7,494,145 B2 * 2/2009 Schroeder et al. ............ 280/276
(Continued)

FOREIGN PATENT DOCUMENTS

JP  07-075219  3/1995
JP  07-172372  7/1995
(Continued)

*Primary Examiner* — Calvin Cheung
*Assistant Examiner* — Thomas Ingram
(74) *Attorney, Agent, or Firm* — Mark R. Huebscher; TechLaw LLP

(57) ABSTRACT

A wheel assembly having a motor attached to a hub within the wheel assembly such that the motor powers the wheel assembly to rotate about an axle once the motor receives a predetermined amount of power. A battery system is configured to deliver power to said motor, the battery system is arranged to rotate with the wheel assembly. A sensor system within the wheel assembly that provides data to a control system related to velocity and angle of orientation of the assembly. A load transferring quick-release mechanism is also disclosed for coupling the wheel assembly to a vehicle wheel attachment frame member and a method is provided for calibrating the same.

18 Claims, 11 Drawing Sheets

(51) Int. Cl.
　　*B60B 35/00*　　(2006.01)
　　*B62M 6/40*　　(2010.01)
　　*B62M 6/45*　　(2010.01)
　　*B62M 6/50*　　(2010.01)
　　*B62M 6/60*　　(2010.01)
　　*B62M 6/65*　　(2010.01)
　　*B62M 6/90*　　(2010.01)
　　*G01P 3/22*　　(2006.01)
　　*G01C 9/10*　　(2006.01)
　　*G01P 3/486*　　(2006.01)
　　*G01P 15/18*　　(2013.01)

(56) References Cited

U.S. PATENT DOCUMENTS

| | | |
|---|---|---|
| 2005/0067207 A1 | 3/2005 | Radtke |
| 2007/0216129 A1 | 9/2007 | Radtke |
| 2008/0093913 A1* | 4/2008 | Katsaros .................... 301/1 |
| 2010/0096912 A1* | 4/2010 | Lude .......................... 301/110.5 |
| 2010/0109425 A1* | 5/2010 | Montague et al. ......... 301/124.2 |
| 2011/0278909 A1 | 11/2011 | Chen et al. |
| 2012/0037442 A1* | 2/2012 | Radtke ........................ 180/220 |
| 2013/0241175 A1* | 9/2013 | Talavasek et al. .......... 280/288.4 |

FOREIGN PATENT DOCUMENTS

| | | |
|---|---|---|
| JP | 07-172377 | 7/1995 |
| JP | 10-035576 | 2/1998 |
| JP | 2000-118477 | 4/2000 |
| JP | 2004-306818 | 11/2004 |
| JP | 2005-349876 | 12/2005 |
| JP | 2008-111541 | 5/2008 |
| WO | 2010/091323 A1 | 8/2010 |
| WO | 2011/021164 A2 | 2/2011 |

* cited by examiner

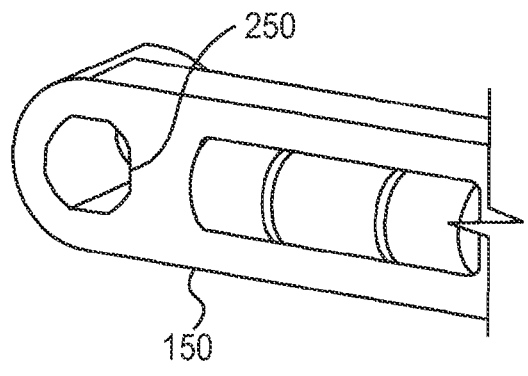 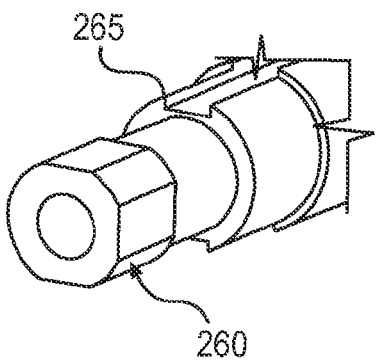
FIG. 11A  FIG. 11B
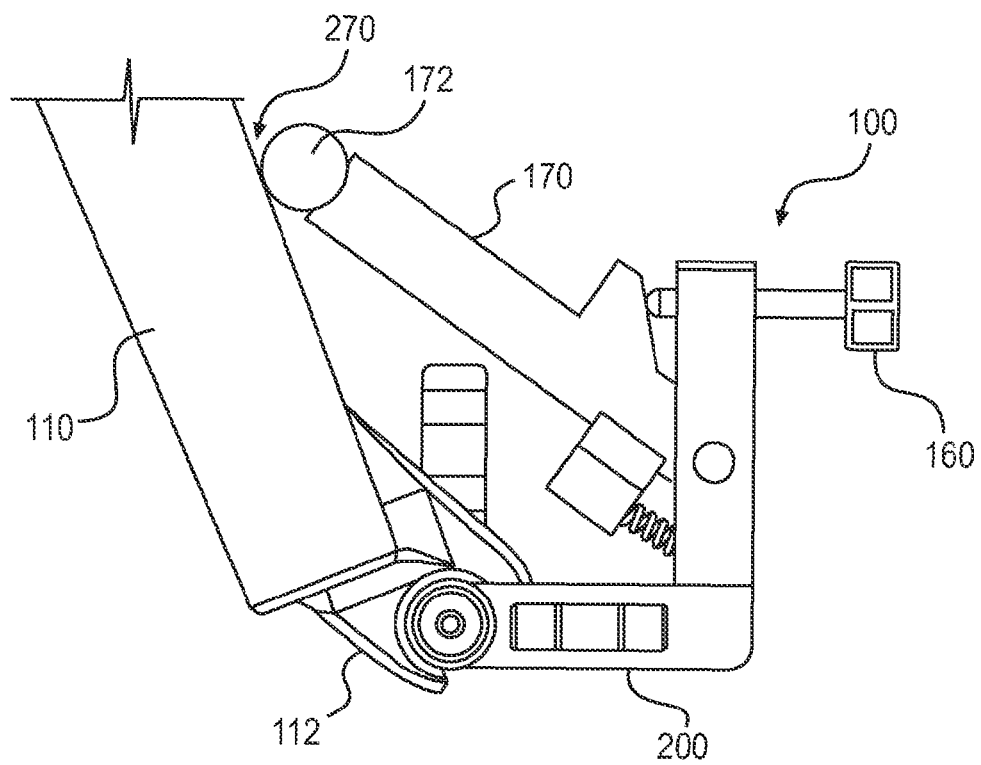
FIG. 12

COUPLER FOR SMART ELECTRICAL WHEEL FOR ELECTRICAL BIKES

CROSS-REFERENCE TO RELATED APPLICATIONS

This application is a continuation-in-part of copending application Ser. No. 12/989,408, filed Oct. 22, 2010, which is a 371 of International Application No. PCT/US2010/023424, filed Feb. 6, 2010, which is the nonprovisional of Provisional Application No. 61/206,909, filed Feb. 6, 2009, which applications are hereby incorporated herein by reference in their entireties and from which applications priority is hereby claimed under 35 USC §119(e) and §120.

FIELD OF THE INVENTION

The present invention pertains to hybrid bicycles and, more particularly, to retrofitting conventional bicycles to convert them to hybrid bicycles by use of a specialized coupler.

BACKGROUND

Numerous electrically powered bicycles and hybrid bicycles currently exist within the marketplace. Hybrid, as used herein, refers to bicycles or vehicles that are powered using multiple power sources. A hybrid bicycle, as used herein, refers to bicycles that have an electrical power source plus at least one other power source.

Kits are currently available that can be used to retrofit conventional, manually powered bicycles into either electrically powered or hybrid powered bicycles. These kits typically provide electrically powered wheels or parts that convert conventional wheels into electrically powered wheels. Currently available kits have hardware distributed throughout various parts of the bike.

An example of one type of currently available kit for the retrofitting of conventional bicycles to create electrical or hybrid bicycles, requires users to assemble batteries somewhere on the bicycle frame and to install controllers of some type on the handle bar so the user can control the electrical power to the motor. The assembly of these kits takes time and some customers are discouraged with the time needed as well as the technical expertise and tools required to complete the assembly.

There remains a need for assemblies that can retrofit conventional bicycles to create hybrid, or electrical bicycles, that do not require significant user assembly or have numerous parts distributed on various areas of the bicycle.

SUMMARY

Embodiments described herein discuss the design of an electrical bicycle wheel and algorithms used to control electrical bicycle wheel.

Other embodiments disclose algorithms and combination of sensors within an electrical wheel that control power to an electric or hybrid bicycle without the need for user input.

Additional embodiments disclose an electrical wheel where the user controls power to the motor through an external control mechanism.

Still additional embodiments described herein discuss an electrical bicycle wheel having all the hardware components incorporated inside a front wheel assembly.

Other embodiments described herein discuss an electrical bicycle wheel that employs an accelerometer to control the electrical power of the bicycle Still other embodiments detail a wheel that is a single assembly that can be used to retrofit bicycles to create a hybrid bicycle.

Another embodiment provides an electrical front wheel assembly containing all the hardware necessary to retrofit a conventional bicycle to create a hybrid bicycle without any tools for conventional bicycles that have a quick release skewer.

Still other embodiments disclose a method allowing a user to manually set the algorithm's slope to zero using a quick-release system for an electrical front wheel assembly.

In one aspect of various exemplary embodiments, a wheel assembly comprising: a motor attached to an axle within the wheel assembly; a battery system within the wheel assembly that is configured to deliver power to the motor; a sensor system within the wheel assembly that provides data related to velocity and angle of orientation of the wheel assembly; and a control mechanism that receives data related to velocity and angle of orientation for the wheel assembly from the sensor system, the control mechanism having at least one input from the battery system indicative of an amount of power that is delivered to the motor.

In one aspect of various exemplary embodiments, a load transferring quick release mechanism for attaching an electric motor wheel assembly to a vehicle wheel attachment frame member, comprising: a center shaft about which the wheel assembly can rotate; a lever arm pivotably connected to an end of the center shaft to allow movement between a first position for securing the wheel assembly and a second position for releasing the wheel assembly from the vehicle wheel attachment frame member; an end nut operably connected to an opposite end of the center shaft opposite the lever arm for adjusting a distance between the end nut and lever arm and securing the wheel assembly to the vehicle wheel attachment frame member; a motor shaft sharing a same axis as the center shaft; a load carrying member coupled to a first end of the motor shaft and substantially perpendicular thereto; a stop arm pivotably connected to the load carrying member; and an adjustment mechanism coupled to the load carrying member, adjusting an angle of the stop arm, wherein the stop arm and the load carrying member operate to translate torque generated by the motor to a non-axis portion of the vehicle wheel attachment frame member.

In one aspect of various exemplary embodiments, a method for calibrating a quick release mechanism, comprising the steps: installing a wheel assembly onto a vehicle wheel attachment frame member; inserting a center shaft of a quick release mechanism through a motor shaft of the wheel assembly; installing a lever arm of the quick release mechanism onto an end of the center shaft; installing a load carrying member and stop arm of the quick release mechanism onto the motor shaft; moving an adjustment feature of the quick release mechanism to a minimum position; rotating the quick release mechanism about the wheel assembly axis until the stop arm contacts a non-axis portion of the vehicle wheel attachment frame member; installing an end nut onto the center shaft; alternatively adjusting the end nut and moving the lever from a released to a secured position in order to provide an optimal tightness of the wheel assembly onto the vehicle wheel attachment frame member; moving the lever arm to a released position; moving the adjustment feature until a level indicator displays horizontal; and moving the lever arm to a secured position.

In one aspect of various exemplary embodiments, a load transferring quick release mechanism for attaching an electric motor wheel assembly to a vehicle wheel attachment frame member, comprising: means for enabling the wheel assembly to rotate; means for securing the wheel assembly to the vehicle wheel attachment frame member; means for load carrying coupled to one end of the securing means and substantially perpendicular thereto; means for transferring torque from the load carrying means, the means for transferring torque being pivotably connected to the load carrying means; and means for adjusting at least one of a position and angle of the transferring torque means, wherein an end of the transferring torque means contacts a non-axis portion of the vehicle wheel attachment frame member.

Additional embodiments provide a quick-release system for a load transferring quick release mechanism that eliminates metal breaking at the axle caused by overstress and fatigue.

BRIEF DESCRIPTION OF THE DRAWINGS

The various embodiments can be better understood with reference to the following drawings. Those of skill in the art will understand that the drawings, described below, are for illustrative purposes only and are not intended to limit the scope of the present teachings in any way. Accordingly, other embodiments may be used in addition to or instead of the embodiments presented herein, without departing from the spirit and scope of this disclosure. When the same numeral appears in different drawings, it is intended to refer to the same or like components or steps.

FIG. 11A is a perspective view of an exemplary embodiment of the load carrying member of the electrical bicycle wheel coupling mechanism.

FIG. 11b is a perspective view of an exemplary embodiment of the motor shaft of the electrical bicycle wheel.

FIG. 12 is a left-side plan view of an exemplary embodiment electrical bicycle wheel coupling mechanism installed onto a bicycle frame.

DETAILED DESCRIPTION

Figure 1:
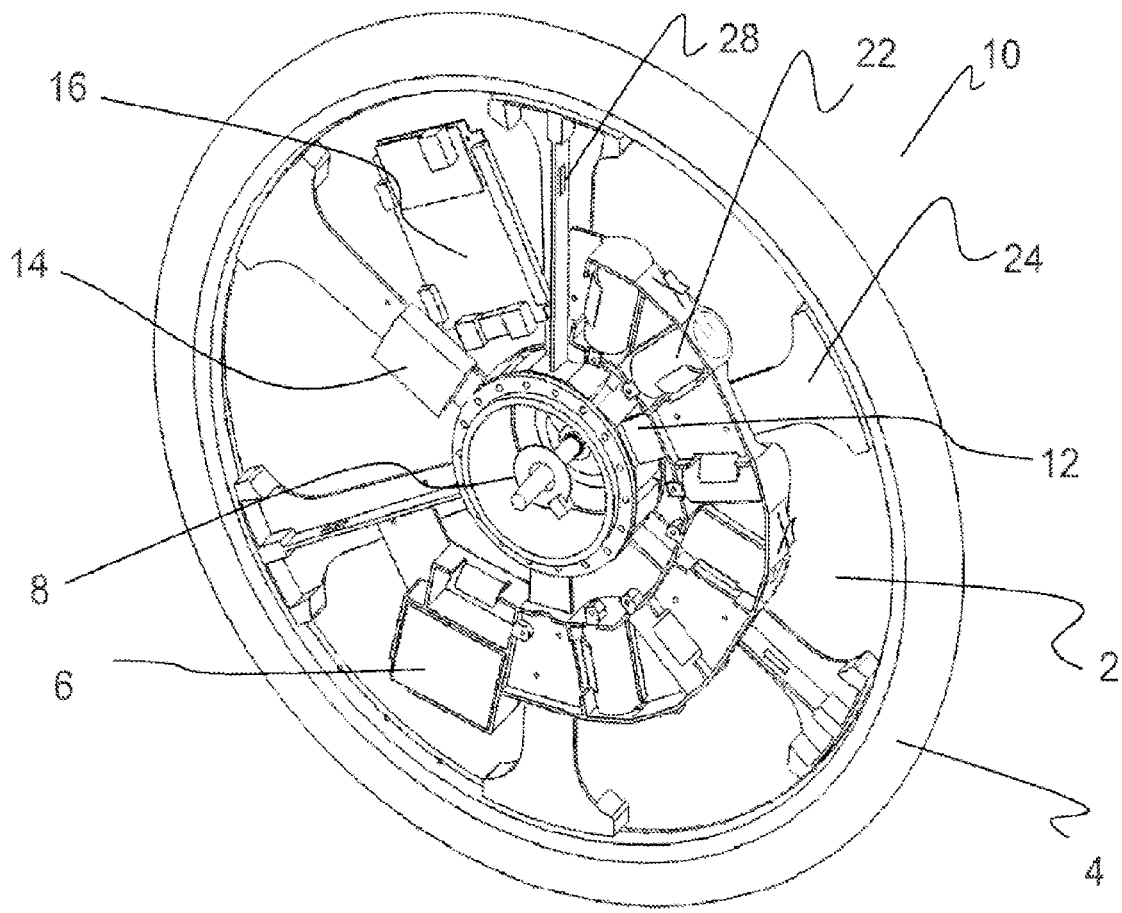
FIG. 1 is a cut away, perspective view of an embodiment for an electrical bicycle wheel.

FIG. 1 is an illustration of an embodiment for a bicycle front wheel assembly 10 that provides power using only elements contained within the wheel assembly 10. Wheel assembly 10 is powered by motor 12 that mounted around central axle 8. The wheel assembly has tire 4 and cover 2. Cover 2 exists on both sides of wheel assembly 10 but is removed from the viewing side to allow the interior portions of the wheel assembly to be seen.

The wheel assembly 10 rotates about axle 8. An example of a motor that can be used for motor assembly 12 within wheel assembly 10 is a 24 volt, 250 watt motor manufactured by Jia-Yu.

In an embodiment, a control mechanism is supplied outside the wheel assembly 10 to allow a user to increase or power supplied by wheel assembly 10. The user will use the control mechanism to command power to the motor 12.

In another embodiment, there is no user control mechanism and the wheel assembly is provided with sufficient intelligence to operate without user control or input. The electrical wheel assembly 10 is designed with sufficient intelligence such that no user input is required. Accordingly, no user control mechanism, either on the handle bar or anywhere on the bicycle, is required. The electronics within the wheel assembly 10 makes decisions regarding the amount of power to be supplied to the electrical motor.

In embodiments that do not require user input or control, algorithms and combinations of sensors in the wheel assembly 10 are employed to control voltages applied to the motor 12.

In another embodiment employs wheel assembly 10 as a replacement of a conventional bicycle front wheel. The wheel assembly 10 is a smart electrical wheel designs that makes retrofitting on a conventional bicycle with wheel assembly 10 a trivial task. In this embodiment, the smart electrical wheel assembly 10 contains all the necessary hardware to provide power to drive a bicycle. Included within the wheel assembly 10 are batteries, controllers, cables incorporated inside. The wheel assembly is placed in use by simply replacing the front wheel on conventional bicycle with wheel assembly 10. The conventional bicycle retrofitted with wheel assembly 10 then becomes a hybrid bicycle with manner power applied in a conventional manner and electric power applied through wheel assembly 10.

In an embodiment, electrical wheel assembly 10 may include multiple types of sensors. These sensor types may include accelerometers, encoders in or associated with the motor 12 that measures the angular position of the motor 12 with respect to the ground, and strain gages in one or more spokes 24.

Power for motor 12 is provided by battery assembly 22. Battery assembly 22 is an assembly that contains connections for several batteries. In an embodiment, the battery assembly can rotate with wheel assembly 10. The battery assembly 22 illustrated in FIG. 1 contains batteries dispersed circumferentially around axle 8 such that the battery assembly 22 can rotate with wheel assembly 10. Controller 6 receives signals from main circuit board 16 regarding the amount of power the motor 12 should receive from battery system 22. A DC power connection (not shown) is provided to recharge the battery system 22.

An embodiment for battery assembly 22 employs 20 D-size, rechargeable batteries. An example of a rechargeable battery that can be used are D-size, rechargeable batteries from NEXcell®. It should be noted that numerous types of batteries can be used within battery assembly 22 and battery assemblies can be made that contain more or fewer than 20 batteries. It should be noted that additional assemblies for providing battery power are envisioned that do not contain batteries dispersed circumferentially around axle 8 or that do not rotate with wheel assembly 10.

The wheel assembly 10 illustrated in FIG. 1 may employ various sensors. One type of sensor that may be employed is an accelerometer 14 that provides sensor data indicative of the motion of the wheel assembly. An example of a satisfactory accelerometer 14 is the Freescale KIT3376MMA7341L that provides a three axis analog output. Accelerometer 14 is attached to one of spokes 24 and rotates with wheel assembly 10. Analog sensor data from accelerometer 14 is input into main circuit board 16. The analog sensor data from accelerometer 14 can be converted to digital sensor data on main circuit board 16. While accelerometer 14 rotates with the wheel assembly 10, embodiments are envisioned having accelerometers that do not rotate with wheel assembly 10 but instead remain in a fixed position relative to axle 8.

While the use of analog information is described, it is well understood that one of ordinary skill in the art may easily modify the exemplary embodiments to use digital information, if so desired, without departing from the spirit and scope of this disclosure.

An example of an available circuit board that can provide the functions required by main circuit board 16 is the RABBIT BL4S200, or the like. In an embodiment using the RABBIT BL4S200, the processor contained thereon can perform a Fast Fourier Transform (FFT) of the digital sensor data from the accelerometer 14. Embodiments can have the processor perform mathematical operations on the digital sensor data from accelerometer 14 in real time. The processor on a RABBIT BL4S200 is sufficiently fast to perform these operations in real time.

Other embodiments can implement, a Look Up Table (LUT) within memory contained in the main circuit board 16. The RABBIT BL4S200 contains flash memory that can provide LUT functionality. The sensor data from the accelerometer 14 can be converted from time domain to frequency domain by an FFT and placed within an LUT. The LUT can be read to provide the angle at which wheel assembly 10 currently exists.

Another sensor that may be used within wheel assembly 10 is an encoder 18 that functions to provide data relative to the linear velocity of the wheel assembly 10. Encoder 18 may be a rotary encoder having one part that does not rotate with wheel assembly 10 and another part that does rotate with wheel assembly 10. To determine the linear velocity of rotating wheel assembly 10, the movement of the part that rotates with wheel assembly 10 is measured with respect to the part that does not rotate with wheel assembly 10. An example of such an encoder is the Avago HEDS-9701.

The Avago HEDS-9701 contains a Light Emitting Diode (LED) having emitted light collimated into a parallel beam by a collimating lens that is positioned in the path of the light. Opposite the LED is a set of photodetectors and associated the signal processing circuitry that produces digital waveforms from light received from the LED. In an embodiment, the LED, collimating lens, photodetectors and signal processing circuitry rotate with wheel assembly 10 and the codewheel remains in a fixed spatial relationship to axle 8.

The codewheel is positioned between the LED and the photodetectors. The codewheel does not rotate with the wheel assembly 10. Therefore, the relative movement of codewheel with respect to the LED and the photodetectors causes the light beam to be interrupted by the pattern of spaces and bars on the codewheel. The photodiodes detect these interruptions that are arranged in a pattern. The photodetectors are spaced such that a light period on one pair of photodetectors corresponds to a dark period on the adjacent pair of photodetectors.

The outputs from the photodiodes are input into comparators within the signal processing circuitry that produce final outputs for channels A and B. The outputs of channel A and channel B are digital signals that are 90 degrees out of phase, or otherwise stated said to be in quadrature. The counting of number of phases of the spinning codewheel leads to a determination of the velocity of wheel assembly 10. These signals for output channels A and B are input into main circuit board 16. The outputs from the A and B channels can be placed within a LUT as will be discussed in further detail below. Other embodiments can use the outputs from channels A and B directly in mathematical calculations without employing a LUT on main circuit board 16 or place them into memory on main circuit board 16 and use them directly.

The rotary encoder described above is an example of one specific type of rotary encoder and it will be readily apparent to those skilled in the art that other rotary encoders could be used. Additionally, other types of encoders rather than rotary encoders may be used to determine the velocity of a bike employing wheel assembly 10.

In one embodiment, a configuration of sensors employs an encoder and an accelerometer.

The accelerometer 14 can be positioned such that is rotates with wheel assembly 10 to measure acceleration intensity. The value of acceleration is read by the electronics together with the encoder 18 reading. The encoder 18 reading can be initialized by artificially setting to zero when the wheel is in a flat surface. Once initialized, the electronics keeps track of the encoder position and the accelerometer readings. In an embodiment, the encoder 18 position and accelerometer 14 readings are used by the processor on main circuit board 16 to calculate the speed and position, respectively. The phase angle of the accelerometer can be calculated to provide a measure of the slope. The electronics can also calculate the encoder 18 position change is units of time, which is a measure of the bicycle speed. These two values, of slope and speed can be compared in real time by the processor on main circuit board 16 to provide information to generate the corresponding voltage needed by the motor to compensate for the slope and to compensate for the drag due to velocity.

Other embodiments that employ lookup tables can retrieve data previously calculated and placed in look up tables, are compare the values contained in look up tables during operation of wheel assembly 10. The resulting comparisons provide information to generate the corresponding voltage needed by the motor to compensate for the slope and to compensate for the drag due to velocity.

As stated above, the algorithm requires that the slope initially be set to zero. Therefore, the user has to calibrate the unit on a flat surface. In this type of embodiment, the initial slope is calculated when the bicycle starts (and is assumed to be on level ground) is stored and subtracted from the phase angle calculated on subsequent revolutions after initialization. Alternatively, an initialization reset mechanism can be incorporated into wheel assembly 10 allowing a user to indicate a starting point.

In an embodiment, a method is disclosed for manually calibrating the algorithm's initial slope to zero. However, by incorporating one of more strain gage sensors 28, this initialization step can be eliminated.

In an embodiment, one or more strain gage sensors 28 are located on spokes 24. In embodiments using strain gage sensors 28 located on each spoke 24, the output from the strain gage sensors 28 reaches a maximum once the end of spoke near the tire is closest to the ground resulting in the maximum amount of strain on that spoke 24. The resulting FFT of the strain gages together with the accelerometer FFT will give the slope without any calibration.

In embodiments using a single strain gage sensor 28, the electronics associated with the strain gage sensor 28 can calculate a centroid of the stress value to identify the placement angle of the wheel assembly.

In an embodiment, a wheatstone bridge amplifier is associated with each strain gage sensor 28. In other embodiments, multiple strain gage sensor 28 will provide multiple resistance values within a wheatstone bridge circuit.

Figure 2:
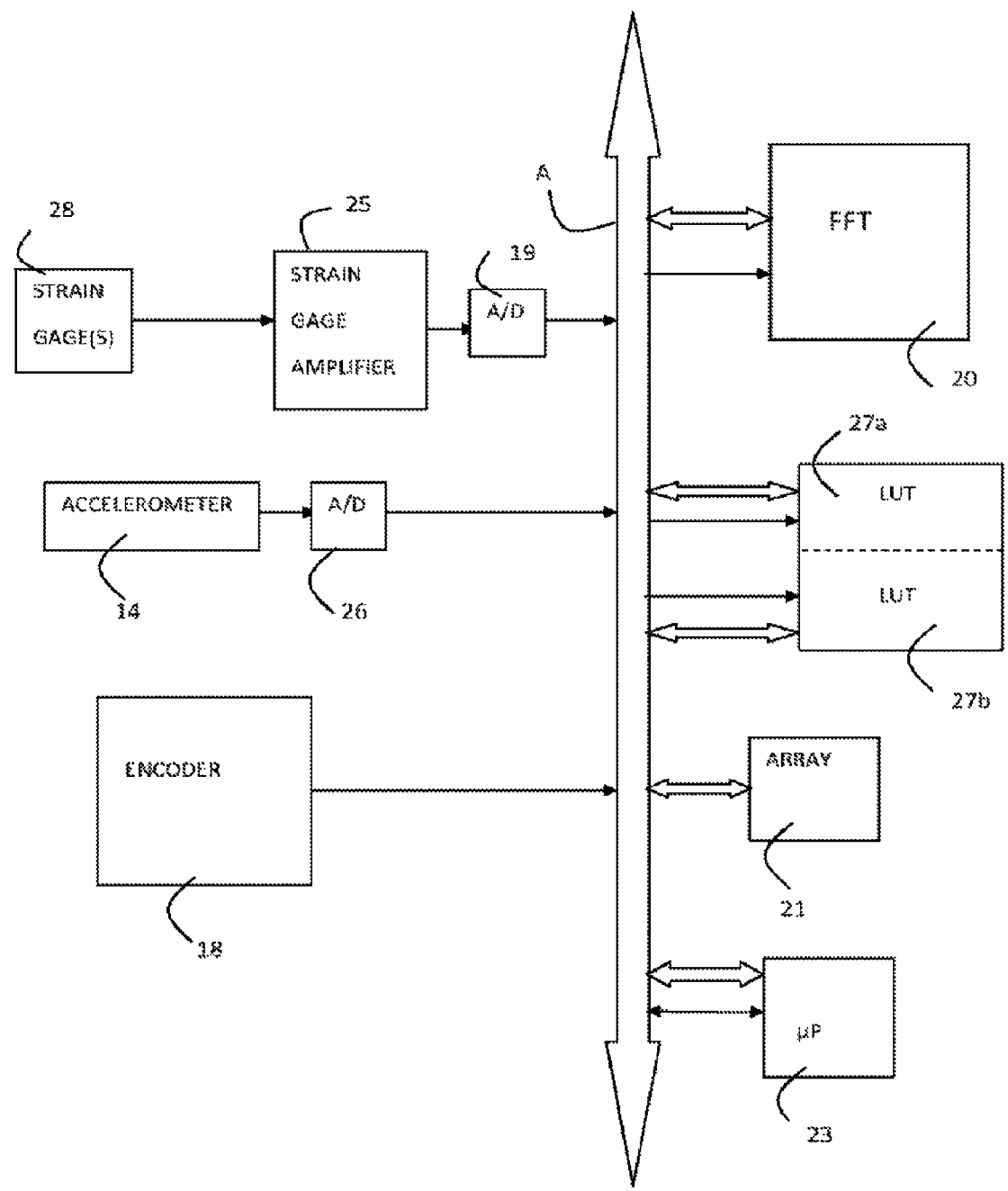
FIG. 2 is a functional block diagram for the determination of output voltage applied to the wheel motor.

FIG. 2 is an illustration of a functional block diagram for an embodiment of wheel assembly 10. The embodiment shown in FIG. 2 is a wheel assembly 10 that can operate without the need of any user control and hence requires no user interface. The embodiment in FIG. 2 the wheel assembly provides electronics allowing the user to simply pedal or brake. The wheel assembly 10 has multiple sensors that provide sufficient intelligence to read the slope and the speed of the bicycle.

The sensors in the embodiment for wheel assembly 10 illustrated in FIG. 2 include one or more strain gages 28. The strain gages 28 provide a simple and effective initialization for the wheel assembly 10. Each strain gage 28 can have a wheatstone bridge amplifier circuit (full, half or quarter) associated with it to provide an indication that the resistance value of that strain gage has changed. A strain gage amplifier 25 can be used to provide excitation for a wheatstone bridge amplifier circuit and to amplify the strain gage reading.

For embodiments using multiple strain gages on spokes of wheel assembly 10, the force exerted by the ground will create a maximum reading for the strain gage 28 on the spoke 24 closest to ground. These embodiments can place a strain gage 28 on each spoke 28 to create intelligence that will allow the processor 23 on the main circuit board to know the position of the wheel assembly.

An embodiment includes measuring the slope angle with respect to the gravity by using a single strain gage 28. The strain gage 28 can be configured to measure stress in multiple directions. The centroid of the stress can then be used to locate position of the wheel assembly 10. Embodiments employing a single strain gage 28 can be used to determine a centroid of stress levels and in a manner that informs processor 23 on the main circuit board of the position of the wheel assembly 10.

Analog to Digital convertor (A/D) 19 converts strain gage data into digital form where it is place on to buss A. The strain gage data can then be used to by the processor 23.

Encoder 18 provides quadrature signals indicative of the movement of wheel assembly 10 around axle 8. The signals from encoder 18 can, in an embodiment, be digital signals. Therefore, analog to digital conversion is not required. These quadrature signals are placed onto bus A and used by processor 23 to calculate the linear velocity at which wheel assembly 10 is moving.

In other embodiment, the quadrature signals may be placed into memory on main circuit board 16 and read out by the processor to calculate velocity. A Look Up Table (LUT) 27a via bus A could also be used for this purpose.

The accelerometer 14 measures forces exerted through movement of wheel assembly 10 as well as forces due to gravity. The accelerometer 14 will produces voltage outputs responsive to force exerted on the accelerometer 14. These voltage outputs are the data received and converted to digital form by A/D 26. The digitized version of the accelerometer data is then made available to Bus A where it is placed into array 21. The data from array 18 may be read out periodically by processor 23 and a Fast Fourier transform may be made using FFT 20.

In another embodiment, the Fast Fourier Transform for the data from accelerometer 14 is placed into Look Up Table (LUT) 27b via bus A. The data located in LUT 27b can be used by the processor.

Array 21 and FFT 20 can be located in memory on main circuit board 16. Array 21 is an allocation of memory for storage purposes. Instead of array 21 being used as a data structure, other data structure such as a linked list could also be used. FFT 20 a program that can reside within memory on main circuit board 16.

In embodiments employing LUTs 27a, 27b, these can be located in flash memory on main circuit board 16.

The Fast Fourier Transform of data from accelerometer represents the slope. During initialization, subtracting the phase angle for the strain gages from the accelerometer phase angle (e.g. $\phi A - \phi S$) gives the sloped angle at which the wheel assembly 10 exits.

In an embodiment, the electronics can employ look up tables (LUT). These look up tables 27a, 27b may contain accelerometer data as a function of slope angle and data from strain gages.

In an embodiment, the computer reads the two LUTs 27a, 27b depending on the values of the sensors and combines the values from the LUTs 27a, 27b to produce a value for the output voltage that is to be output from the battery assembly 22 to the motor 12. In this manner the processor on the main circuit board 16 can compensate for slope and drag force due the bicycles velocity making the bicycle easier and more enjoyable to ride.

Other embodiments may make calculations directly from the sensor and do not require the use of look up tables.

Figure 3:
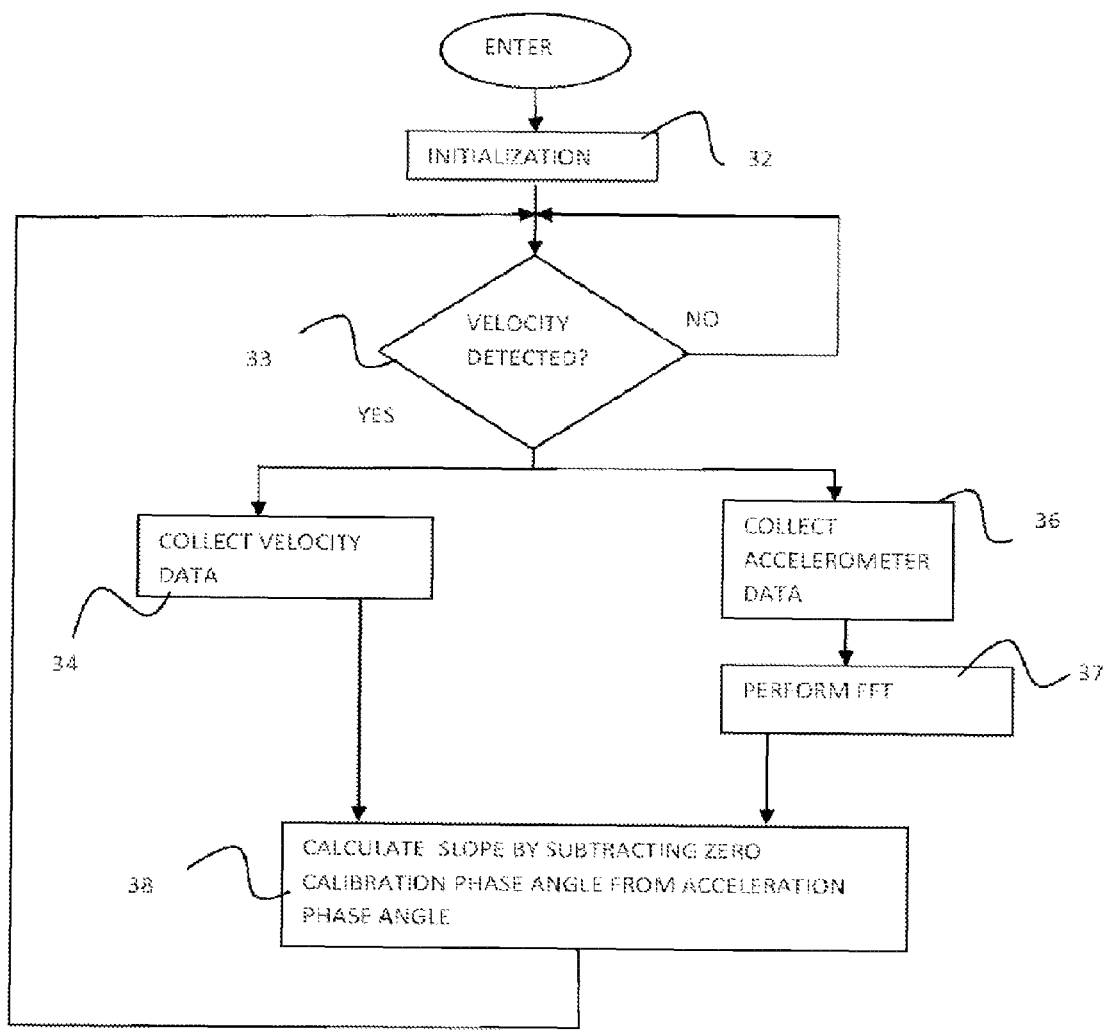
FIG. 3 is a flow chart of the operation for the electrical bicycle wheel shown in FIG. 1.

FIG. 3 is a flow diagram showing the basic functioning of the calculation of slope, velocity and phase angle. The routine is entered once wheel assembly 10 is being used. The system for wheel assembly goes through an initialization 32 wherein system resources are acquired as needed and the various parts are initialized. Velocity Detected 33 waits for sufficient movement in the wheel assembly before reading any sensor data. In this manner there is 0 volts applied to motor 12 while the bicycle is at a stand-still position. Once velocity is detected, parallel branches are taken. Collect Velocity Data 34 is similar to the flow diagram in FIG. 4 and Collect Accelerometer Data is similar to the flow diagram in FIG. 5, may be performed in parallel.

The linear speed of the wheel assembly 10 is determined by Calculate Velocity Data 34. The phase angle for the accelerometer data is determined by Perform FFT 36. The Calculate Slope By Subtracting Velocity Phase Angle From Accelerometer Phase Angle 38 give the angle of inclination to help determine the output voltage that should be delivered from the battery assembly 22 to the motor 12 by controller 6.

The routine of FIG. 3 then returns to the post initialization state and begins the routine again.

In an embodiment, an Angle Calculation can be determined to provide the desired output voltage from the battery assembly 22 to the motor 12 at any given point in time while the bicycle is being ridden. The output voltage should be higher if the bicycle is climbing a hill, and lower if it is travelling on flat ground or going down a hill.

Additionally, the output voltage should be higher if the bicycle is travelling at higher speeds for two reasons: (1) to overcome mechanical drag forces that climb with velocity; (2) to overcome the back emf that is generated by the motor as it spins faster.

The desired output voltage can be derived from the calculation of Equation 1.

Output voltage=[(ANGLE*C1)+(VELOCITY*C2)]+C3    Equation 1:

Wherein, ANGLE is the angle of the surface the bicycle is being ridden on, VELOCITY is the linear speed of the bicycle, C1 is the gain applied to the ANGLE, C2 is the gain applied to the VELOCITY and C3 is an offset applied to the whole calculation.

In an embodiment C1, the gain applied to the angle, is 37, with the angle being represented in radians. C2, the gain applied to the velocity, is 0.42, with the velocity measured in m/sec. C3, the offset applied to the whole calculation, is 0.75 volts. It should be noted that varying embodiments may employ different gains C1, C2 and offset C3 and that the foregoing going is only an example of one of several possible embodiments.

In an embodiment, ANGLE is updated once per revolution of the wheel. The updating of ANGLE can be performed more or less frequently in accordance with differing embodiments.

In another embodiment, VELOCITY is updated N times per revolution of the wheel. The updating of VELOCITY can be performed more or less frequently in accordance with differing embodiments. In an embodiment, the value of N is 90. The frequency that VELOCITY is updated may vary greatly is accordance with varying embodiments.

In an embodiment, each time the VELOCITY is updated, data from the accelerometer 14 can be updated and stored in array within memory on main board 16. Each revolution of wheel assembly 10, the accelerometer data in the array can be read out and used to calculate the phase offset of the accelerometer.

Calculations can be accomplished using the processor 23 on main circuit board 16.

Data Sources:

The data for calculation of VELOCITY and ANGLE can be obtained from two sources: (1) the accelerometer 14; and (2) the two channel digital rotary encoder 18 having one part remaining stationary relative to to axle 8, and another part that rotates with the wheel assembly 10.

Figure 4:
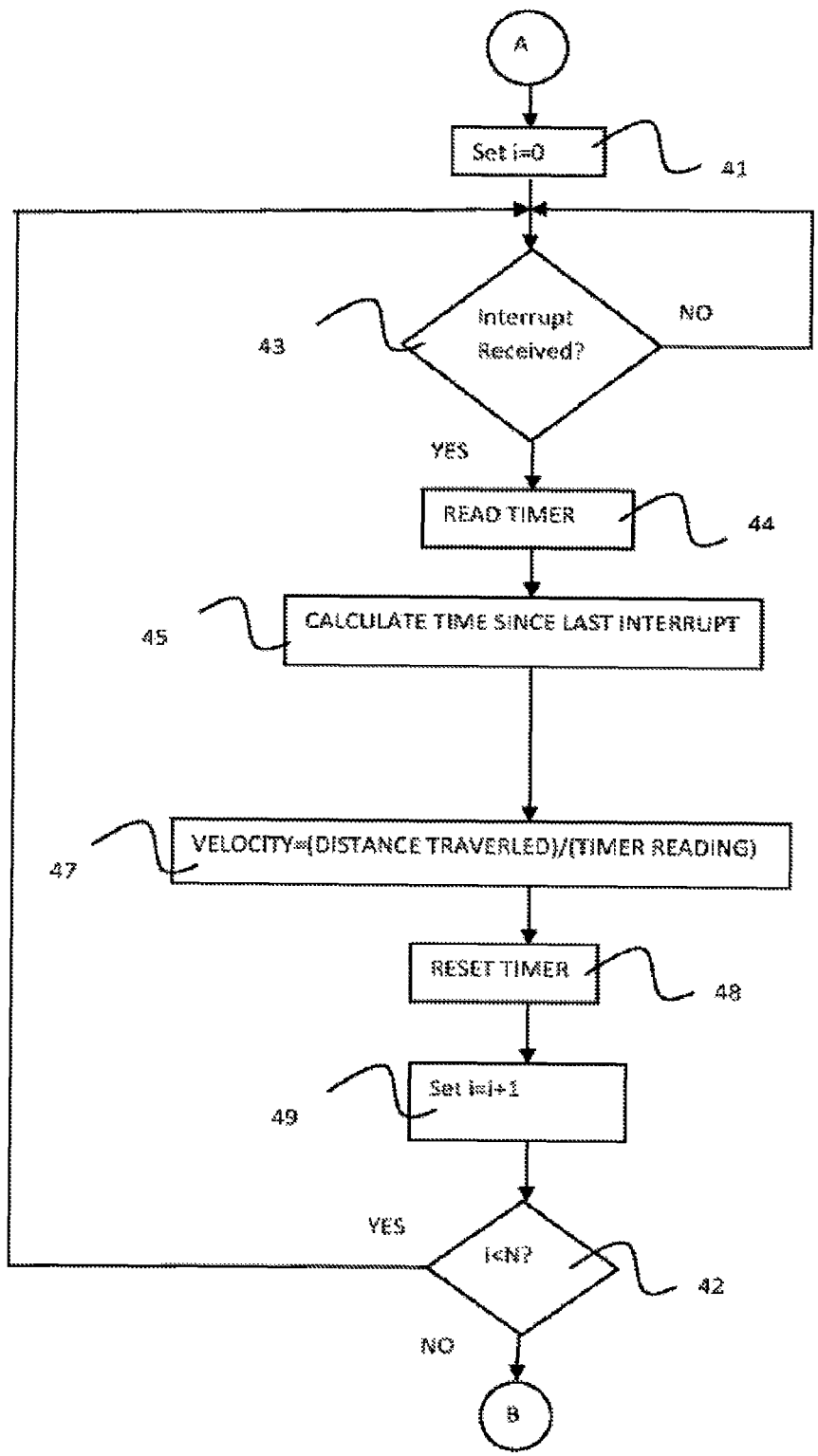
FIG. 4 is a flow chart for calculation of the velocity of electrical bicycle wheel in FIG. 1.

Calculation of VELOCITY:

FIG. 4 is a flow diagram for an embodiment that calculates the speed of wheel assembly 10. Set i=0 41 initializes an indexing variable. Interrupt received 43 waits for an interrupt to the processor on-board main circuit board 16. Encoder 18 generates quadrature pulses as the wheel assembly 10 rotates that are used to interrupt the processor on-board main circuit board 16. Encoder 18 generates quadrature pulses N times per revolution of wheel assembly 10. Therefore, the processor on-board main circuit board 16 is interrupted N times per revolution by pulses form the encoder 18, each interrupt triggering an interrupt service routines (ISR). In an embodiment N is 90; however, this number may be varied greatly in accordance with varying embodiments.

Each time the ISR is triggered, READ TIMER 43 reads the value of a timer on main circuit board 16. CALCULATE TIME SINCE LAST INTERRUPT 45 stores the timer value which is the time since the last interrupt. The distance calculated since the last interrupt is a known value that remains constant between encoder pulses. Using the timer reading and the known distance VELOCITY=(DISTANCE TRAVELED)/TIMER READING 47 distance by performs the relationship shown in Equation 2:

VELOCITY=distance travelled between encoder pulses/timer counts    Equation 2:

Each time encoder 18 provides pulses that interrupt the process on main circuit board 16 occurs, the amount of time since the last pulse from encoder 18 is known (since the last interrupt). In an embodiment, the timer can have a resolution of 100,000 counts per second. Other embodiments will have differing timer resolutions, either more counts per second or fewer counts per second. Implicit in each encoder pulse is that a certain distance has been covered between each pulse. This distance is a constant, making calculation of VELOCITY a simple task.

Once VELOCITY is calculated, RESET TIMER 48 resets the timer to 0. Set i=i+1 increments the indexing variable i that counts of to the value of N. Once i=N, i<N 42 exists the routine of FIG. 4 because a complete revolution of wheel assembly 16 has been completed and the VELOCITY of the wheel assembly 10 calculated.

The VELOCITY dependent portion of the output voltage is thus updated.

In an embodiment, FIG. 4 is not exited but again returns to entry point A and begins velocity calculations for the next revolution of wheel assembly 10.

Calculation of ANGLE:

In an embodiment, the ANGLE calculation is derived from multiple data sources. These data sources can be a rotary encoder and/or an accelerometer.

In an embodiment, the ANGLE calculation is updated one time per revolution of the wheel. Accordingly, in such an embodiment, the data acquisition and calculations described below with reference to FIG. 5 will work in parallel with the data acquisition and calculations described above in reference to FIG. 4.

In an embodiment, the ANGLE calculation is accomplished in two parts:

In Part 1 of the ANGLE calculation, the accelerometer 14 rotates with the wheel assembly 10. Therefore, if the bicycle is rolling at a constant speed on a smooth surface, gravity causes the output of the accelerometer 14 to be a sine wave. Analog to Digital (A/D) conversions are performed on the signal from the accelerometer N times per revolution. These values are stored in memory on main circuit board 16 as an array or linked list. At the completion of a revolution, the data from the accelerometer 14 are stored in memory is used to calculate the phase offset of the signal.

Figure 5:
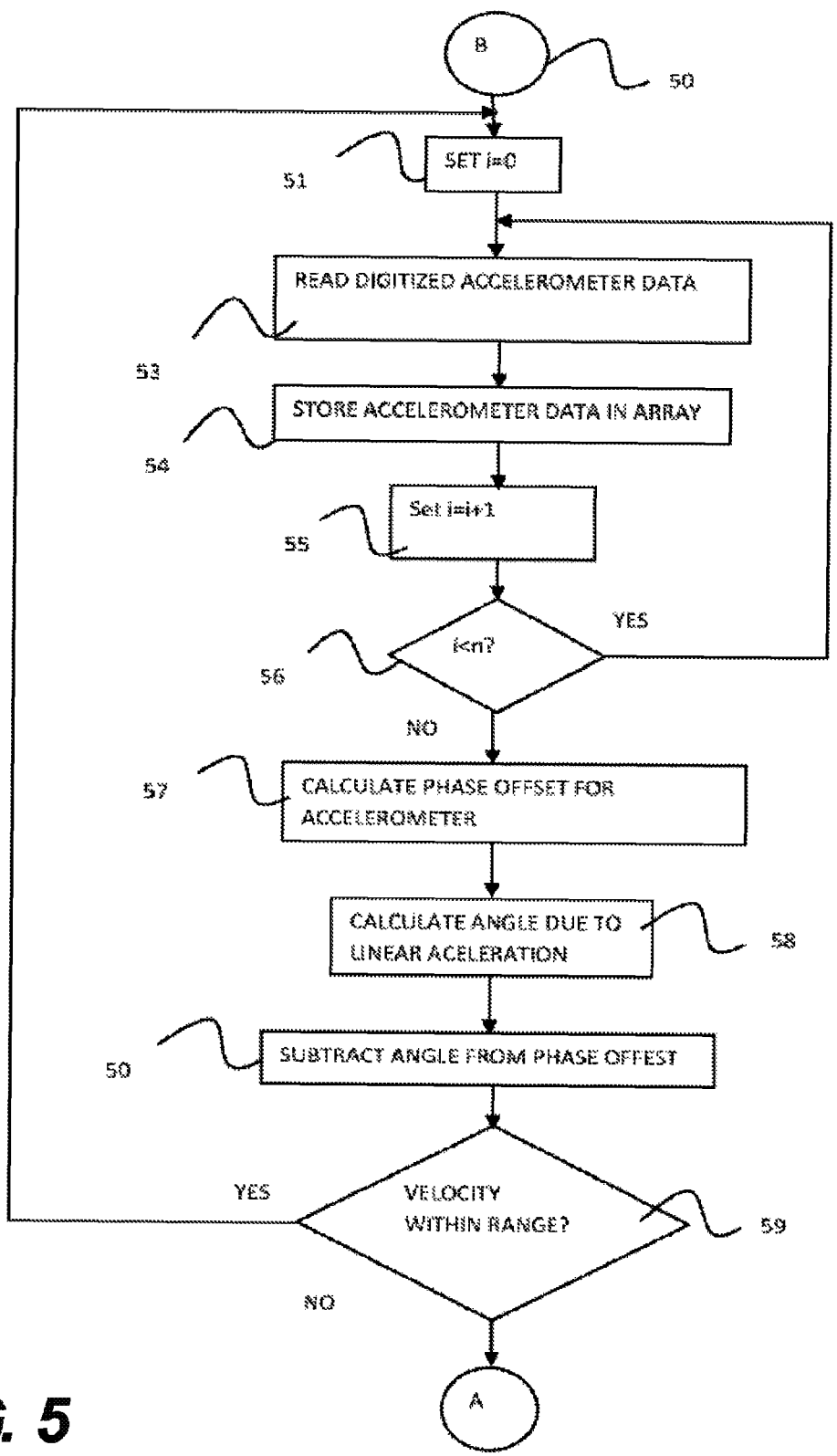
FIG. 5 is a flow chart for the calculation of the angle of the electrical bicycle wheel shown in FIG. 1.

Referring to FIG. 5, the angle calculation routine performed by the processor on the main circuit board 16 has entry point B. As discussed above in reference to FIG. 4, SET i=0 initializes an indexing variable that is used to index the reading of sensor data. READ DIGITIZED ACCELEROMETER DATA 53 acquires sensor data from accelerometer 14. STORE ACCELEROMETER DATA IN ARRAY 54 places the acquired sensor data from accelerometer 14 into memory on main circuit board 16 such that it can be accessed as an array. It should be noted that a linked list of each iteration of the accelerometer data stored read can be created in place of an array. Additionally, any data structure that allows the access to the iterations of accelerometer data stored in memory can be used. Set i=i+1 55 increments the indexing variable i. The decision block i<n 56 checks the value of indexing variable i. The routine in FIG. 5 will branch back loop back to READ DIGITIZED ACCELEROMETER DATA 53 SENSOR until the indexing variable i becomes equal to N.

In an embodiment, the loop described above is performed in parallel with the velocity calculation described in reference to FIG. 4. Each pulses from encoder 18 interrupt the processor on main circuit board 16, the accelerometer data is acquired and stored into an array. This continues through an entire revolution of wheel assembly 10 and then begins again. At the completion of a revolution, the data from the accelerometer 14 are stored in memory is used to calculate the phase offset of the signal. At the completion of a revolution, the data from the accelerometer 14 that has been stored in memory is used to calculate the phase offset of the signal.

In an embodiment, a MatLab implementation is used for the calculation of the phase offset signal from the stored accelerometer data. This MatLab implementation is shown below.

function [ang1,ang2]=angle_calc(y1,N)
% Given one input signal, y1 will return phase offset of the signal
% assuming y1 is primarily 1 Hz over N samples.
% y1 is pendulum signal=A1*cos(2*pi*x+ang1);
% N=90;
x=(0:N−1)/N;
basis_pendulum_cos(x)=cos(2*pi*x);
basis_pendulum_sin(x)=sin(2*pi*x);
a1=0;
b1=0;
for i=1:N,
a1=a1+y1($i$)*basis_pendulum_cos(i);
b1=b1+y1($i$)*basis_pendulum_sin(i);
end
a1=a1/N;
b1=b1/N;
a2=a2/N;
b2=b2/N;
A1=2*sqrt(a1^2+b1^2);
ang1=a tan 2(−b1,a1).

In another embodiment, the calculation performed in the MatLab implementation above is performed by a Fast Fourier Transform (FFT). The FFT can be written in a version of C++, or other high level program to perform the same mathematical computations performed by the foregoing MatLab implementation.

In Part 2 of the ANGLE calculation, accelerometer 14 is employed to sense all acceleration forces, not just gravity. Linear acceleration of the bicycle also forms a component of the total acceleration that the accelerometer measures. In this application, the portion of the angle that is due to linear acceleration of the bicycle is not a desired component. To compensate for this, the linear average linear acceleration is calculated from velocity data in accordance with the relationship of Equation 3:

Referring to FIG. 5, CALCULATE PHASE OFFSET FOR ACCELEROMETER 57 IS PERFORMED AT THE END OF A REVOLUTION either using an FFT, MatLab implementation or other programming solution.

CALCULATE ANGLE DUE TO LINEAR ACCELERATION 58 performs the calculations described below. First an average linear calculation is made according to equation 3:

$$\text{Average linear acceleration} = [(\text{velocity at the end of the revolution}) - (\text{velocity at the start of the revolution})]/(\text{time revolution takes to occur}) \quad \text{Equation 3:}$$

The result from Equation 3 is multiplied by a constant to put it in gravitational units (G's) of 9.81 m/s2.

The portion of the angle due to linear acceleration is then calculated according to the relationship of Equation 4:

$$\text{Apparent\_angle} = a\tan(\text{average linear acceleration}) \quad \text{Equation 4:}$$

SUBTRACT ANGLE FROM PHASE OFFSET 59 subtract The Apparent_angle from the angle calculated in Part 1, resulting in the angle that is used to calculate output voltage.

In an embodiment, if the final calculated angle is outside of the range of +/−7 degrees, it is clipped to +/−7 degrees using logic implemented within the system software that performs the following:

If (angle>7 degrees)
{
Angle=7 degrees
}
If (angle<−7 degrees)
{
Angle=−7 degrees
}

Further Calculations:

To reduce the effect of noise sources, a running average is used for the angle calculation as shown by the following relationship of Equation 4:

$$\begin{aligned}&\text{Angle applied for this revolution} = \text{Average of the}\\&\quad\text{angles calculated for the previous } n \text{ revolutions}\\&\quad\text{(The optimal value of } n \text{ is still being determined.}\\&\quad\text{But as of this writing, } n=4)\end{aligned} \quad \text{Equation 4:}$$

A linear interpolation is performed between the previous angle and the current angle, resulting in an entire revolution to change between the two angles. This insures that there are no abrupt changes in voltage at wheel rotation boundaries.

An example of the interpolation:

Assume that the new angle has been calculated as described above, and the previous angle is also known. Assume the following values:

angle (rev n−1)=1 degree
angle (rev n)=2 degrees
Assume each rev is broken up into 90 steps.

At each step, 1/90th of the difference in angle is applied to the wheel. In our example, the difference in angle is 2 degrees−1 degree=1 degree.

1/90th of 1 degree=0.0111

TABLE 1

| interrupt number | applied angle |
| --- | --- |
| 1 | 1 |
| 2 | 1.0111 |
| 3 | 1.0222 |
| 4 | 1.0333 |
| ... | ... |
| 87 | 1.9667 |
| 88 | 1.9778 |
| 89 | 1.9889 |
| 90 | 2.000 |

As shown in Table 1, an entire revolution of the wheel is used to apply the angle change, avoiding abrupt changes in voltage to the motor.

Figure 6:
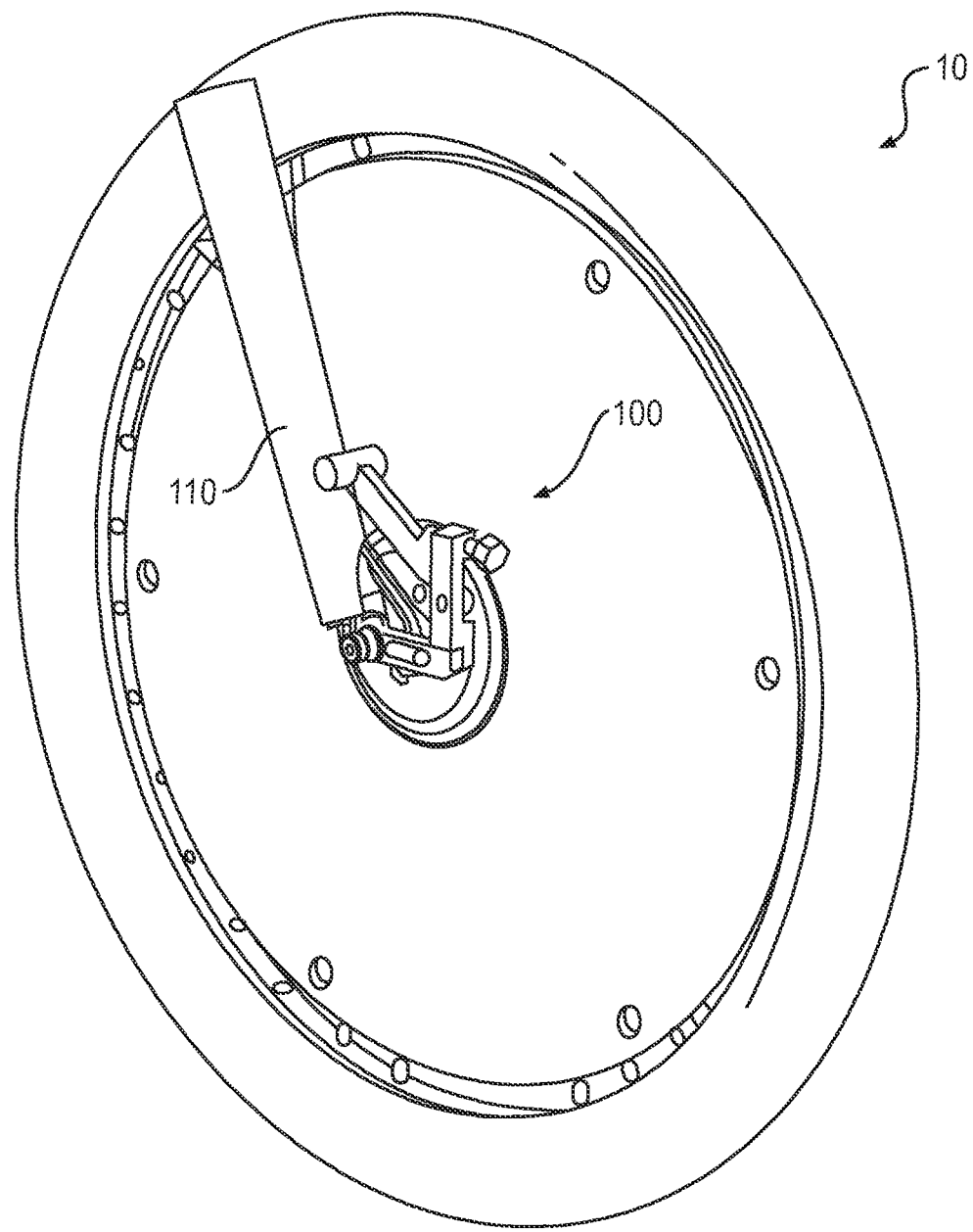
FIG. 6 is an exemplary embodiment of an electrical bicycle wheel coupling mechanism installed on an electrical bicycle wheel.

Referring now to FIG. 6, an exemplary embodiment of an electrical bicycle wheel coupling mechanism 100 is shown installed onto an electrical bicycle wheel 10 and vehicle wheel attachment frame member 110. A vehicle as referenced herein may be a bicycle, tricycle, quadcycle, or other wheeled transportation machine. The coupling mechanism 100 incorporates a quick-release mechanism, as described in subsequent figures, to facilitate removal and installation of the electrical wheel assembly 10 without the need for tools.

In another exemplary embodiment, the coupling mechanism 100 prevents the axle connection end of bicycle frames from breaking, due to the high torsional forces placed on the axle, by transferring the load to a stronger part of the vehicle wheel attachment frame member 110.

In still another exemplary embodiment, the coupling mechanism 100 provides a user with the option of manually calibrating the algorithm's initial slope to zero.

Figure 7:
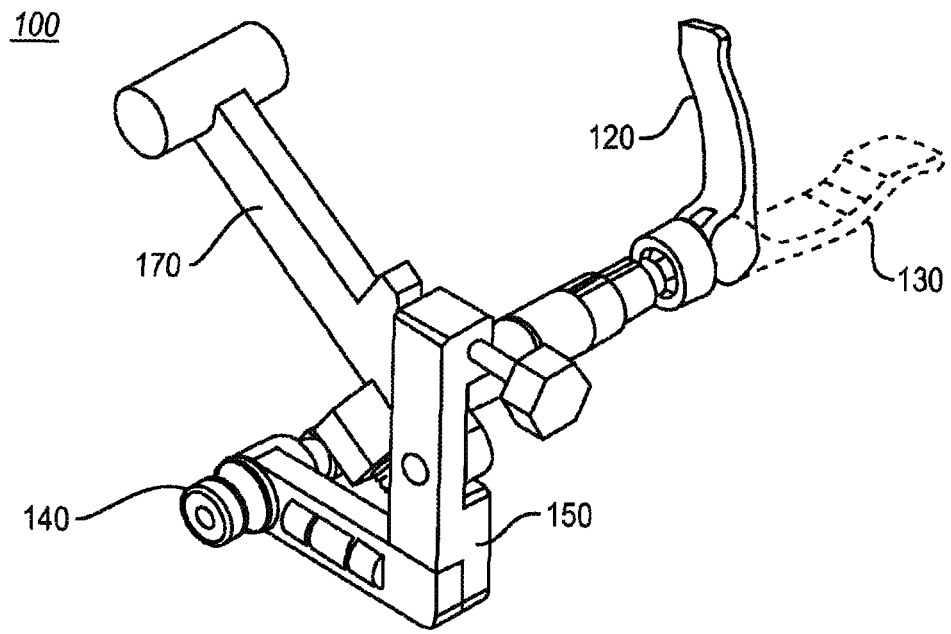
FIG. 7 is a perspective view of an exemplary embodiment electrical bicycle wheel coupling mechanism.

FIG. 7 is a perspective view of an exemplary embodiment of the coupling mechanism 100 with quick-release lever 120 shown in the secured position and in the unsecured position 130 (dotted lines). When moved to the secured position, the lever 120 applies tension to the center shaft 180, shown in FIG. 8, against the end nut 140 which can be threadably coupled to the center shaft 180. The amount of tension placed on the shaft 180 depends on the distance from the end nut 140 to the lever 120 and the distance between the vehicle wheel attachment frame members. When secured, the lever 120 and end nut 140 act as a clamp to pin the wheel assembly 10 to the vehicle wheel attachment frame member 110. The quick-release mechanism is similar to those found in related-art wheel-to frame connections for bicycles and can be adapted for use with the exemplary embodiments described herein. Once the lever 120, end nut 140, and center shaft 180 are secured, then the load carrying member 150 transfers the torque generated by the motor (not shown) to the vehicle wheel attachment frame member 110 through the stop arm 170. Transferring this torque load to the vehicle wheel attachment frame member 110 away from the axel all but eliminates metal failure at the axle caused by overstress and fatigue. It should be noted the following figures illustrate a terminal end of the stop arm 170 as having a configuration that does not encompass or "clamp" around a fork (not shown). This allows the stop arm 170 to be readily pressed against the fork and released from the fork without dismantling the entire assembly. Thus, a quick releasing capability for the stop arm 170 is provided herein.

Figure 8:
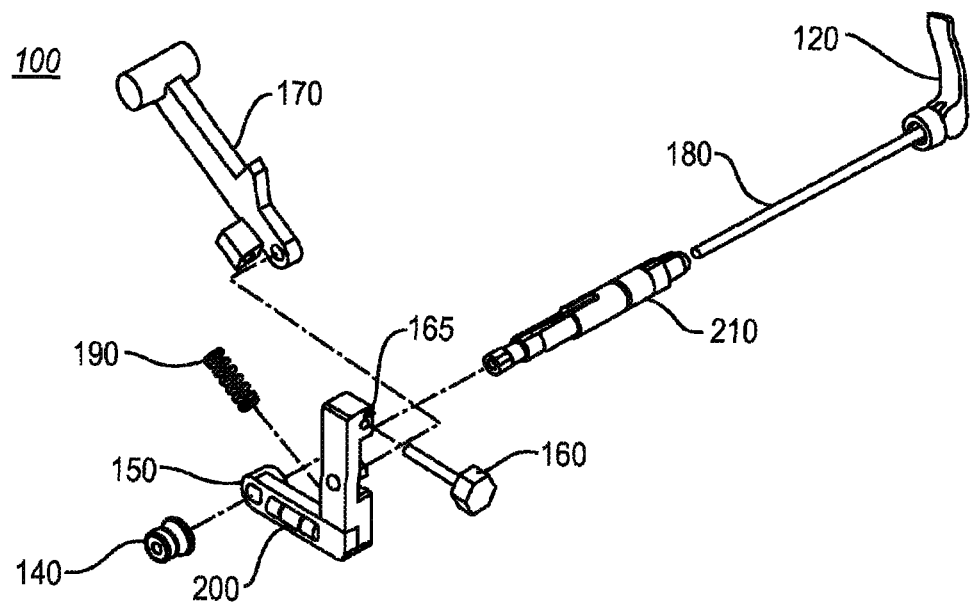
FIG. 8 is an exploded view of an exemplary embodiment electrical bicycle wheel coupling mechanism.
Figure 10:
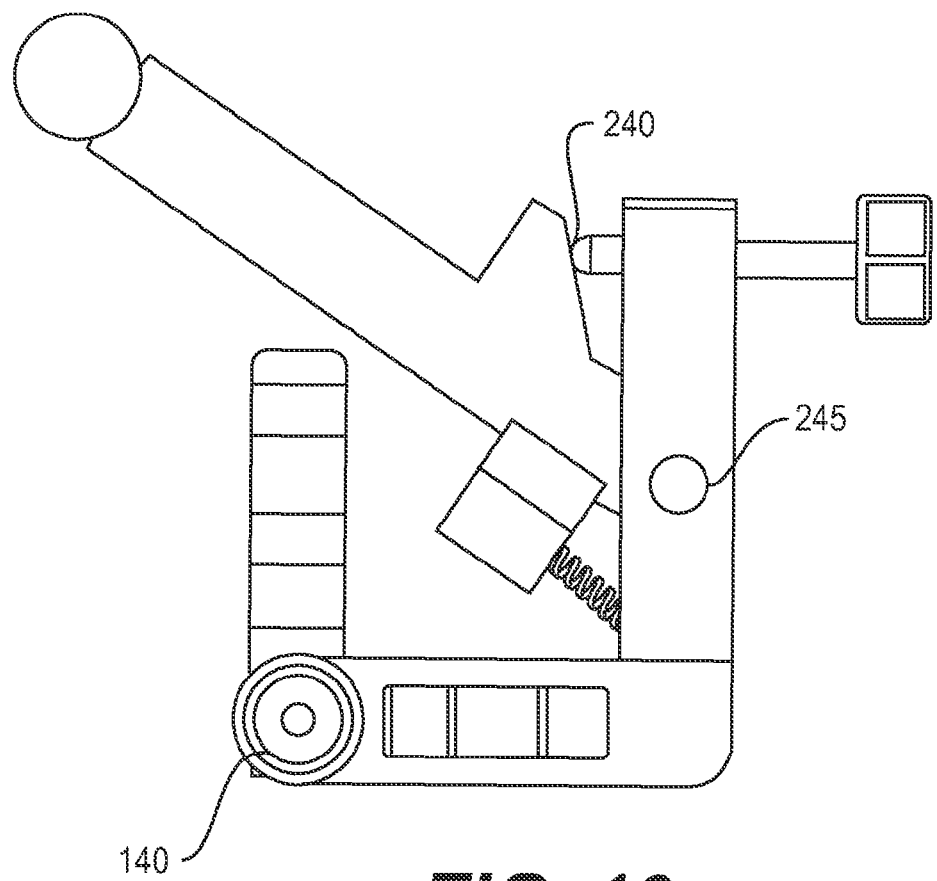
FIG. 10 is a left-side plan view of an exemplary embodiment electrical bicycle wheel coupling mechanism.

FIG. 8 is an exploded view of FIG. 7. In an exemplary embodiment, the center shaft 180 may insert through the motor shaft 210 and both may share the same axis as the wheel assembly 10. When fully inserted, the end of center shaft 180 opposite the lever 120 protrudes beyond the load carrying member 150 so that the end nut 140 may threadably couple to the center shaft 180. The stop arm 170 angle relative to the load carrying member may be adjusted via the adjustment knob 160. The adjustment knob 160, which may comprise a threaded shaft and a hexagonal knob, is threadably coupled to the load carrying member 150 via the threaded hole 165. Of course, other means for adjustment may be utilized according to design preference. The knob 160, when adjusted, may cause rotation of the coupling mechanism 100 about the motor shaft 210. The stop arm 170 may pivot on the load carrying member 150 at pivot point 245 (FIG. 10) to accommodate different vehicle wheel attachment frame members. The stop arm 170 may have different end arrangements to accommodate different vehicle attachment frame members. A spring 190 may be used to maintain contact between the adjustment knob 160 and the stop arm 170 if the stop arm 170 pivots on the load carrying member 150, shown in FIG. 10 as location 240. The load carrying member 150 may accommodate a horizontal level indicator 200 such as a bubble, liquid, or other means with which to determine horizontal. While load carrying member 150 is shown as being in an L-shaped configuration, other shapes such as an arc, and so forth may be used. Similarly, stop arm 170 may be of another form factor or shape. Therefore, various modifications and changes may be made without departing from the spirit and scope of this disclosure.

Figure 9:
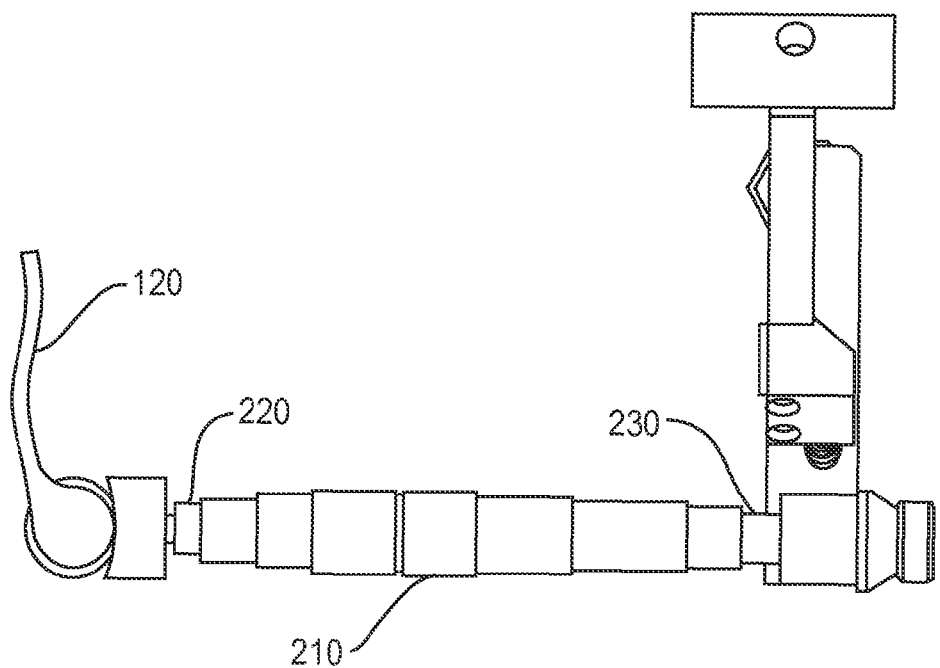
FIG. 9 is a front plan view of an exemplary embodiment electrical bicycle wheel coupling mechanism.

Referring now to FIG. 9, a front view is illustrated that shows a locked position of the lever 120. It is noted that in this embodiment, the motor shaft 210 can have different diameters along its axis, if so desired. In some embodiments, end portions 220, 230 may be of substantially equal diameter and be different than the diameter of the center portion of the motor shaft 210.

Referring now to FIG. 11A and FIG. 11B, an exemplary embodiment is shown where the load carrying member 150 and motor shaft 210 may have special end geometry to allow insertion in only one orientation. A flat 250 may be placed in the load carrying member to correspond with a flat 260 on the end of the motor shaft 210, or other similarly effective methods may be used to prevent rotation of the motor shaft 210 such as a key and keyway 265, a shear pin, press fit, and so forth.

FIG. 12 is a left-side plan view of an exemplary embodiment coupling member 100 mounted on a vehicle wheel attachment frame member 110. The stop arm 170 is shown contacting the vehicle wheel attachment frame member 110 at location 270 (away from the "dropout" 112) understood to be substantially stronger than the "dropout" 112, after knob 160 is adjusted to bring level 200 to horizontal. The motor torque is equalized by the reaction force at locations 270 and 112 and results in lower forces compared with the traditional design of holding the motor torque by using a nut attached to the motor shaft. While stop arm 170 is shown with a "circular" end 172, it is understood that other forms or shapes of the end 172 may be used.

Figure 13:
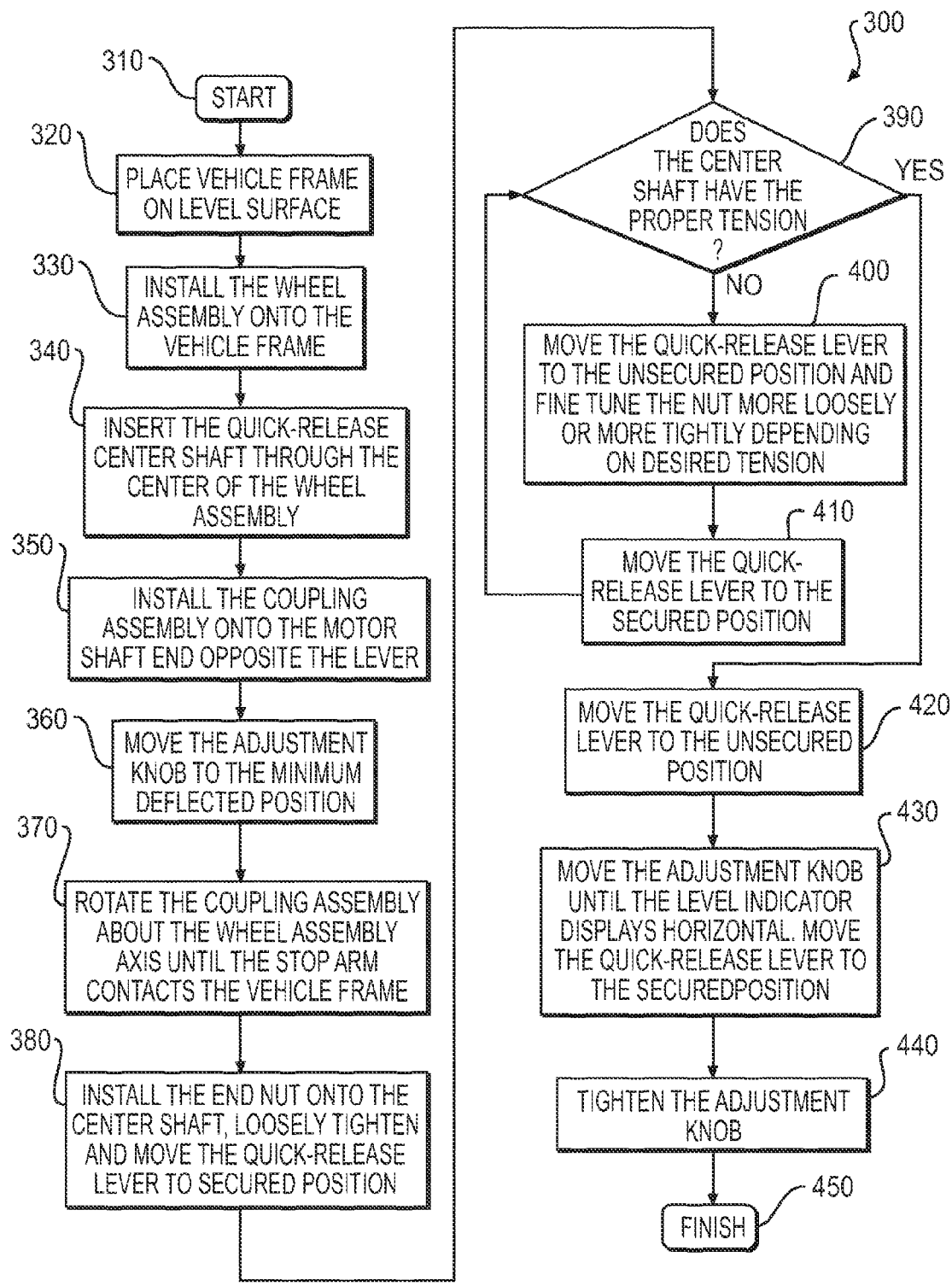
FIG. 13 is a flow chart for manually setting the algorithm's initial slope to zero.

The coupling mechanism 100 may be used in conjunction with a method 300 for manually setting the algorithm's slope to zero (or an equivalent, thereto), such as the process shown in FIG. 13. Once the user selects a substantially level surface upon which to place the vehicle (step 320), the user next installs the electrical wheel assembly onto the vehicle (step 330). The user then inserts the center shaft 180 through the center of the motor shaft 210 until lever 120 prevents further travel (step 340). Next, the user installs the coupling assembly 100 onto the motor shaft 210 end opposite the lever 120 (step 350) and move the adjustment knob 160 to a minimum deflected position (step 360). Then, rotate the coupling assembly 100 about the wheel assembly axis until the stop arm 170 contacts the vehicle frame 110 (step 370). The end nut 140 is loosely tightened onto the center shaft 180 and the quick-release lever 120 is moved to the secured position (step 380). If the tension on the center shaft created by the tightening of the nut and the securing of the lever is inadequate (step 390), then the user must fine tune the nut tightness with the lever tightness (step 400) and then re-secure the lever (step 410) to recheck tension. After the proper tension is achieved, then the user moves the lever 120 to the unsecured position (step 420) and adjusts knob 160 until the level indicator 200 is horizontal (step 430). Finally, the user can re-secure the lever 120 and tighten the knob 160 (step 440), ending at step 450.

Figure 14:
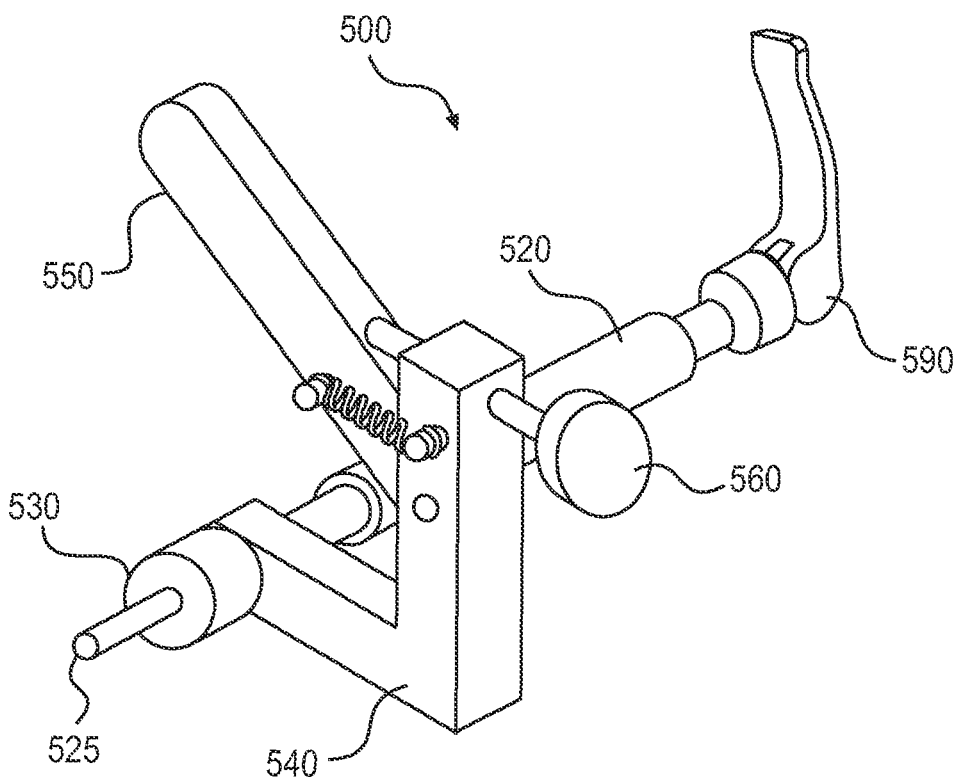
FIG. 14 is a perspective view of an exemplary embodiment electrical bicycle wheel coupling mechanism.
Figure 15:
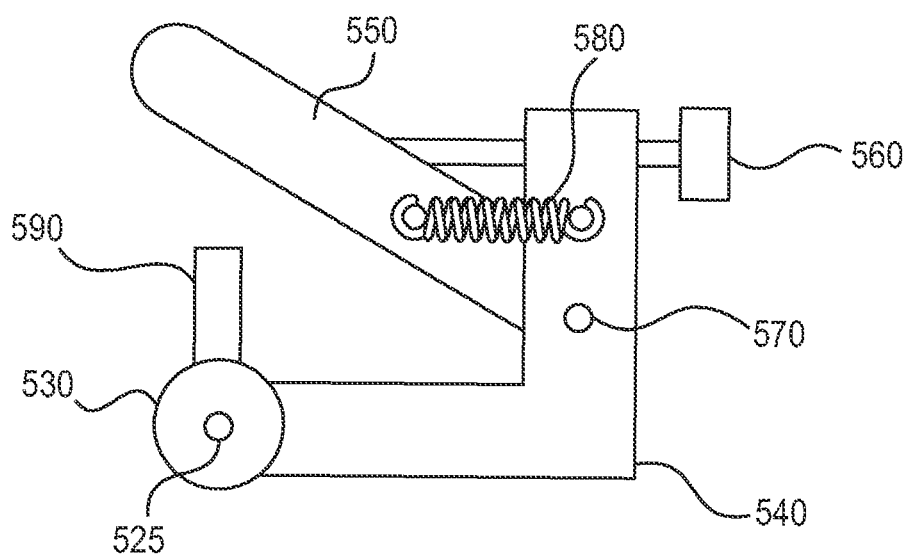
FIG. 15 is a left-side plan view of an exemplary embodiment electrical bicycle wheel coupling mechanism.

FIG. 14 and FIG. 15 are provided to illustrate one of several possible alternate exemplary embodiments of the coupling mechanism. As in the previous embodiments, the motor shaft 520 engages the load carrying member 540, which in turn couples to the stop arm 550 about a pivot 570. The angle of the stop arm 550 is adjustable through the adjustment knob 560 and spring 580. The lever 590 and center shaft 525 are coupled opposite the end nut 530, which, when tightened, clamp the coupling assembly 500 to a wheel assembly (not shown) and vehicle frame (not shown).

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A load transferring quick release mechanism for attaching an electric motor wheel assembly to a vehicle wheel attachment frame member, comprising:
   a center shaft about which the electric motor wheel assembly can rotate;
   a lever arm pivotably connected to an end of the center shaft to allow movement between a first position for securing the electric motor wheel assembly and a second position for releasing the electric motor wheel assembly from the vehicle wheel attachment frame member;
   an end nut operably connected to an opposite end of the center shaft opposite the lever arm for adjusting a distance between the end nut and lever arm and securing the electric motor wheel assembly to the vehicle wheel attachment frame member;
   a motor shaft sharing a same axis as the center shaft;
   a load carrying member rotatably coupled to a first end of the motor shaft and substantially perpendicular thereto;
   a stop arm pivotably connected to the load carrying member, the stop arm having a terminal end adapted to not encompass a fork, allowing rapid release therefrom; and
   an adjustment mechanism coupled to the load carrying member, adjusting an angle of the stop arm
   wherein the stop arm and the load carrying member operate to translate torque generated by the motor to a non-axis portion of the vehicle wheel attachment frame member.

2. The quick release mechanism of claim 1, wherein the motor shaft is coupled to the vehicle wheel attachment frame member.

3. The quick release mechanism of claim 1, further comprising a predetermined motor shaft end geometry, wherein the load carrying member is slidably insertable onto the motor shaft at only one angle of orientation due to the motor shaft's end geometry.

4. The quick release mechanism of claim 1, wherein the load carrying member has a first member and a second member, the first member being capable of being coupled to the motor shaft and the second member being capable of supporting the stop arm.

5. The quick release mechanism of claim 1, further comprising a spring operably connected to the stop arm and load carrying member for ensuring the stop arm maintains contact with the adjustment mechanism.

6. The quick release mechanism of claim 1, wherein the stop arm contacts the vehicle wheel attachment frame member at a radial distance from an axis of wheel rotation.

7. The quick release mechanism of claim 1, wherein the lever arm is operable to adjust a distance between the end nut and the lever arm.

8. The quick release mechanism of claim 1, further comprising:
   a level indicator, wherein the adjustment mechanism coupled to the load carrying member is adjusted to an angle of the stop arm until the level indicator displays horizontal.

9. A load transferring quick release mechanism for attaching an electric motor wheel assembly to a vehicle wheel attachment frame member, comprising:
   a center shaft about which the electric motor wheel assembly can rotate;
   a lever arm pivotably connected to an end of the center shaft to allow movement between a first position for securing the electric motor wheel assembly and a second position for releasing the electric motor wheel assembly from the vehicle wheel attachment frame member;
   an end nut operably connected to an opposite end of the center shaft opposite the lever arm for adjusting a distance between the end nut and lever arm and securing the electric motor wheel assembly to the vehicle wheel attachment frame member;
   a motor shaft sharing a same axis as the center shaft;
   a load carrying member coupled to a first end of the motor shaft and substantially perpendicular thereto;
   a stop arm pivotably connected to the load carrying member, the stop arm having a terminal end adapted to not encompass a fork, allowing rapid release therefrom; and
   an adjustment mechanism coupled to the load carrying member, adjusting an angle of the stop arm,
   wherein the stop arm and the load carrying member permit rotatable adjustment about the motor shaft, and operate to translate torque generated by the motor to a non-axis portion of the vehicle wheel attachment frame member.

10. The quick release mechanism of claim 9, wherein the motor shaft is coupled to the vehicle wheel attachment frame member.

11. The quick release mechanism of claim 9, further comprising a predetermined motor shaft end geometry, wherein the load carrying member is slidably insertable onto the motor shaft at only one angle of orientation due to the motor shaft's end geometry.

12. The quick release mechanism of claim 9, wherein the load carrying member has a first member and a second member, the first member being capable of being coupled to the motor shaft and the second member being capable of supporting the stop arm.

13. The quick release mechanism of claim 9, further comprising a spring operably connected to the stop arm and load carrying member for ensuring the stop arm maintains contact with the adjustment mechanism.

14. The quick release mechanism of claim 9, wherein the stop arm contacts the vehicle wheel attachment frame member at a radial distance from an axis of wheel rotation.

15. The quick release mechanism of claim 9, wherein the lever arm is operable to adjust a distance between the end nut and the lever arm.

16. The quick release mechanism of claim 9, further comprising a level coupled to at least one of the first and second member of the load carrying member.

17. A load transferring quick release mechanism for attaching an electric motor wheel assembly to a vehicle wheel attachment frame member, comprising:
   means for enabling the electric motor wheel assembly to rotate;
   means for securing the electric motor wheel assembly to the vehicle wheel attachment frame member;
   means for load carrying rotatably coupled to one end of the securing means and substantially perpendicular thereto;
   means for transferring torque from the load carrying means, the means for transferring torque being pivotably connected to the load carrying means and having a terminal end adapted to not encompass a fork, allowing rapid release therefrom; and
   means for adjusting at least one of a position and angle of the transferring torque means, wherein an end of the transferring torque means contacts a non-axis portion of the vehicle wheel attachment frame member.

18. The quick release mechanism of claim 17, further comprising means for indicating a horizontal level, rigidly coupled to the load carrying means.

* * * * *